US008696275B2

(12) United States Patent
Wallace et al.

(10) Patent No.: US 8,696,275 B2
(45) Date of Patent: Apr. 15, 2014

(54) CREEP LIMITING DIRECT TENSION INDICATING WASHER

(75) Inventors: Ivan Wayne Wallace, Walpole, NH (US); Jordan Richardson, Walpole, NH (US)

(73) Assignee: Applied Bolting Technology Products, Inc., Bellow Falls, VT (US)

( * ) Notice: Subject to any disclaimer, the term of this patent is extended or adjusted under 35 U.S.C. 154(b) by 142 days.

(21) Appl. No.: 13/343,054

(22) Filed: Jan. 4, 2012

(65) Prior Publication Data

US 2013/0170921 A1 Jul. 4, 2013

(51) Int. Cl.
*F16B 31/02* (2006.01)

(52) U.S. Cl.
CPC ............ *F16B 31/028* (2013.01); *Y10S 411/903* (2013.01)
USPC ............................................ 411/10; 411/903

(58) Field of Classification Search
USPC ............ 411/8–11, 13, 14, 902, 903, 156, 542
See application file for complete search history.

(56) References Cited

U.S. PATENT DOCUMENTS

| | | | | |
|---|---|---|---|---|
| 2,648,833 | A * | 8/1953 | Wilson et al. | 340/668 |
| 3,696,412 | A * | 10/1972 | Swanson | 340/668 |
| 3,788,186 | A * | 1/1974 | Crites | 411/8 |
| 3,945,704 | A * | 3/1976 | Kraus et al. | 439/411 |
| 4,164,164 | A * | 8/1979 | Trungold | 411/10 |
| 4,483,648 | A | 11/1984 | Trungold | |
| 5,385,054 | A | 1/1995 | Kramer | |
| 5,586,851 | A * | 12/1996 | Haage | 411/10 |
| 5,913,647 | A | 6/1999 | Hodge | |
| 6,425,718 | B1 | 7/2002 | Herr et al. | |
| 7,854,434 | B2 * | 12/2010 | Heiman et al. | 277/644 |
| 2008/0138167 | A1 | 6/2008 | Wallace | |

OTHER PUBLICATIONS

PCT International Search Report and Written Opinion of the International Searching Authority for International Application No. PCT/US2012/065141, Mar. 18, 2013, 11 pages.

* cited by examiner

*Primary Examiner* — Flemming Saether
(74) *Attorney, Agent, or Firm* — Cantor Colburn LLP

(57) ABSTRACT

A direct tension indicating washer includes a body having a first surface having a protuberance formed thereon; the body having a second surface having an indentation formed opposite the protuberance; and an insert positioned internal to the body, the body and the insert being made from materials of different hardness.

11 Claims, 3 Drawing Sheets

100
102
4
12
14
110
4
62

CREEP LIMITING DIRECT TENSION INDICATING WASHER

BACKGROUND

The invention relates in general to direct tension indicating washers and in particular to direct tension indicating washers that limit creep.

Direct tension indicating (DTI) washers are used in the art to indicate when proper bolt tension has been reached. U.S. Pat. No. 5,931,618, the entire contents of which are incorporated herein by reference, discloses an exemplary DTI. FIG. 1 is a top view of the DTI from U.S. Pat. No. 5,931,618. A direct tension indicating washer 60 includes protuberances 12 formed on a first surface 14 and corresponding indentations 16 formed on a second surface 18 opposite the protuberances 12. The direct tension indicating washer 60 also includes channels 62 that lead from each indentation 16 to the outer diameter of the direct tension indicating washer 60. The indentation 16 is filled with an indicating material 64. The direct tension indicating washer 60 is manufactured using a tool and die to stamp the protuberances 12, indentations 16 and channels 62 into a blank washer. Other processes, such as metal machining, electronic printing, or metal casting may be used to form the direct tension indicating washer 60. Direct tension indicating washer 60 is made from carbon steel, but stainless steel, nonferrous metals, and other alloy products may also be used. The indicating material 64 is an extrudable, elastomeric solid material such as colored silicone. FIG. 2 is a cross-sectional view taken along line 2-2 of FIG. 1.

While the direct tension indicating washer of FIGS. 1-2 is well suited for its intended purposes, a tension indicating device for compressive loads required by many non-structural industries (e.g., mining, gasketed pipe flange joints) is significantly lower than what the typical steel material for a structural DTI, (ASTM 959) is manufactured with. As such, the amount of plastic deformation required to provide the appropriate user feedback and other performance requirements of a tension indicating device are difficult to achieve with steel as a sole material of manufacture. Thermoplastics or other intrinsically softer materials are available to provide the required amount of deformation for the intended performance criteria, but such materials have long term compressive creep concerns that would exclude their suitability.

SUMMARY

Embodiments of the invention include a direct tension indicating washer having a body having a first surface having a protuberance formed thereon; the body having a second surface having an indentation formed opposite the protuberance; and an insert positioned internal to the body, the body and the insert being made from materials of different hardness.

BRIEF DESCRIPTION OF THE DRAWINGS

Referring now to the drawings wherein like elements are numbered alike in the several Figures.

DETAILED DESCRIPTION

Embodiments of the invention related to a direct tension indicating washer that indicates proper bolt tension at loads lower than those used with conventional direct tension indicating washers. In order to allow the direct tension indicating washer to indicate lower bolt tension, the direct tension indicating washer is made from a plastic or thermoplastic. To prevent the long term creep of thermoplastics or other soft materials, an insert is included within the formation of the direct tension indicating washer of a non-deformable structure to prevent the long term creep while under load. Such inserts could be in the form of one or more pellets or rings placed within the direct tension indicating washer to provide a limit to the amount of deformation possible to the softer direct tension indicating washer material between the nut, bolt head or washer and the face of the materials being fastened.

Figure 3:
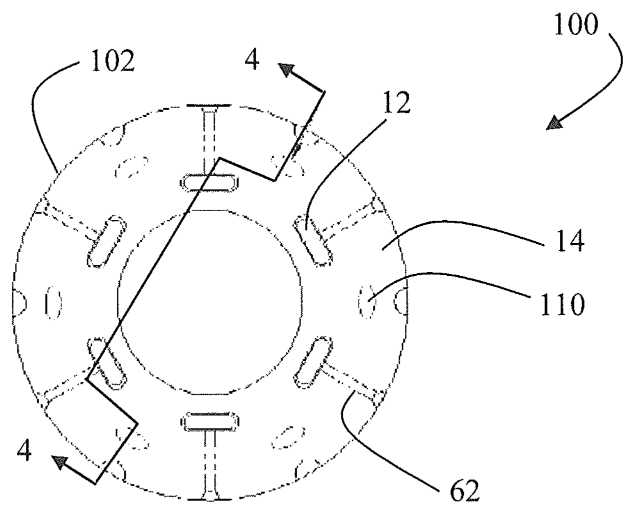
FIG. 3 is a top view of a direct tension indicating washer in exemplary embodiments.

FIG. 3 is a top view of a direct tension indicating washer 100 in exemplary embodiments. The direct tension indicating washer 100 is similar in construction to the direct tension indicating washer 60 of FIG. 1. Direct tension indicating washer 100 includes a body 102 having protuberances 12 formed on a first surface 14 and corresponding indentations 16 formed on a second surface 18 opposite the protuberances 12. The direct tension indicating washer 100 also includes channels 62 that lead from each indentation 16 to the outer diameter of the direct tension indicating washer 100. The indentation 16 is filled with an indicating material 64. The indicating material 64 is an extrudable, elastomeric solid material such as colored silicone.

Figure 1:
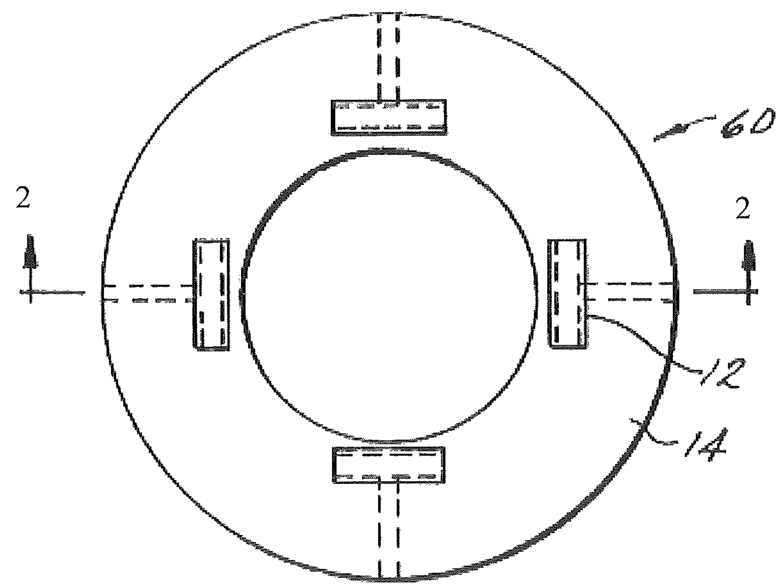
FIG. 1 is a top view of a conventional direct tension indicating washer.
Figure 2:
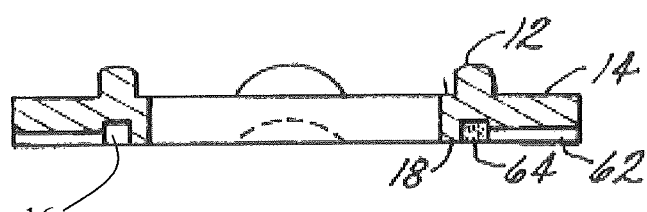
FIG. 2 is a cross-sectional view of the direct tension indicating washer shown in FIG. 1 taken along line 2-2.

Direct tension indicating washer 100 is made from a softer, deformable material than that used to construct direct tension indicating washer 60 of FIG. 1. Exemplary materials that may be used to form direct tension indicating washer 100 include plastics and thermoplastics such as ABS, acetal, PTFE, polyester, nylon and polypropylene. By using a softer material, the direct tension indicating washer 100 may be used to indicate lower bolt tensions than the direct tension indicating washer 60 of FIG. 1. Direct tension indicating washer 100 operates in a similar manner as direct tension indicating washer 60 of FIG. 1. That is, as a nut is tightened on a bolt passing through direct tension indicating washer 100, pressure on protuberances 12 causes the protuberances 12 to be pressed towards surface 14. This causes the indicating material 64 to be forced through channel 62. The direct tension indicating washer 100 is calibrated so that the indicating material 64 appears at the outer periphery of the direct tension indicating washer 100 when the proper bolt tension is achieved. Direct tension indicating washer 100 may include features from U.S. Pat. No. 6,425,718, U.S. Patent Application Publication 20080138167, U.S. Pat. No. 7,857,562 and U.S. Patent Application Publication 20110123288, the entire contents of all these publications are incorporated herein by reference.

As direct tension indicating washer 100 is made from a deformable material, there is a need to prevent washer creep after installation to maintain bolt tension. To address creep, direct tension indicating washer 100 includes one or more inserts 110. The inserts 110 may be a plurality of inserts positioned within the body of direct tension indicating washer 100, at equally spaced radial angles. In the example in FIG. 3, six inserts are used, each spaced at 60-degree intervals. The thickness of the inserts 110 is approximately equal to the thickness between first surface 14 and second surface 18.

Inserts 110 may be flush with first surface 14 and/or second surface 18, or may be recessed with respect to first surface 14 and/or second surface 18. In alternate embodiments, the insert is a single ring insert positioned in the direct tension indicating washer 100 and is positioned between the ID and OD of the direct tension indicating washer 100.

Inserts 110 are made from a material that is harder than the material used for the body of the direct tension indicating washer 100. In exemplary embodiments, inserts 110 are made from metal (e.g., steel or stainless steel). To generalize, the body 102 of direct tension indicating washer 100 is made from a material having a hardness that is lower than the hardness of the inserts 110. Using metal for inserts 110 also provides for conduction of electricity between the nut 132 and structure 140 (FIG. 4) which is necessary in some applications.

Washer 100 may be formed using rapid prototyping methods, such as stereolithography, selective laser sintering, fused deposition modeling, etc. The washer 100 may be formed with pockets to accept inserts 110 by press fitting the inserts 110 into washer 100. The use of rapid prototyping techniques allows manufacturers to quickly meet customer demand.

Figure 4:
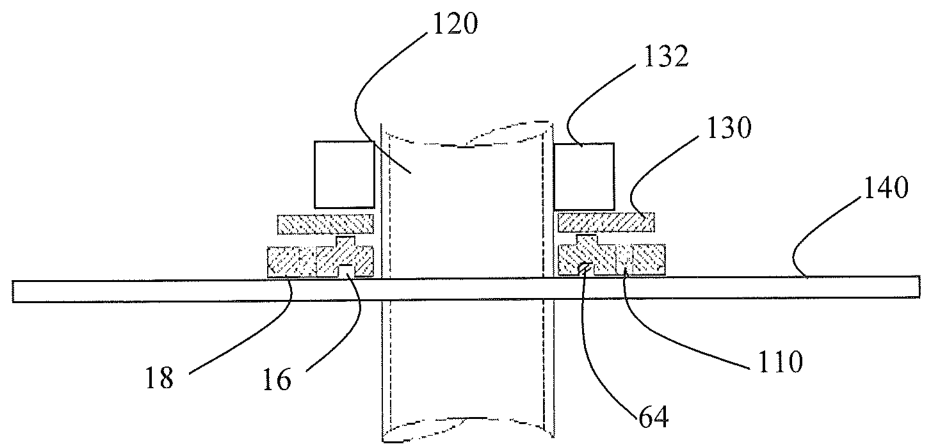
FIG. 4 depicts a cross-section of the direct tension indicating washer of FIG. 3 with a bolt.

FIG. 4 depicts a cross-section of the direct tension indicating washer of FIG. 3 with a bolt 120 inserted through the ID of the direct tension indicating washer 100. A washer 130 is shown positioned adjacent protuberances 12. As nut 132 is tightened, direct tension indicating washer 100 is compressed between washer 130 and structure 140. When the calibrated bolt tension is reached, indicating material 64 forced through channels 62 appears at the outer periphery of direct tension indicating washer 100. By this point, or shortly thereafter, washer 130 is also in contact with inserts 110. As such, creep of the direct tension indicating washer 100 will not result in a decrease in bolt tension. Further, compression of the direct tension indicating washer 100 causes the inner diameter of the direct tension indicating washer 100 to decrease due to the Poisson effect. This reduction in the inner diameter of the direct tension indicating washer 100 can cause the direct tension indicating washer 100 to seal around the bolt shank, and prevent corrosion.

Figure 5:
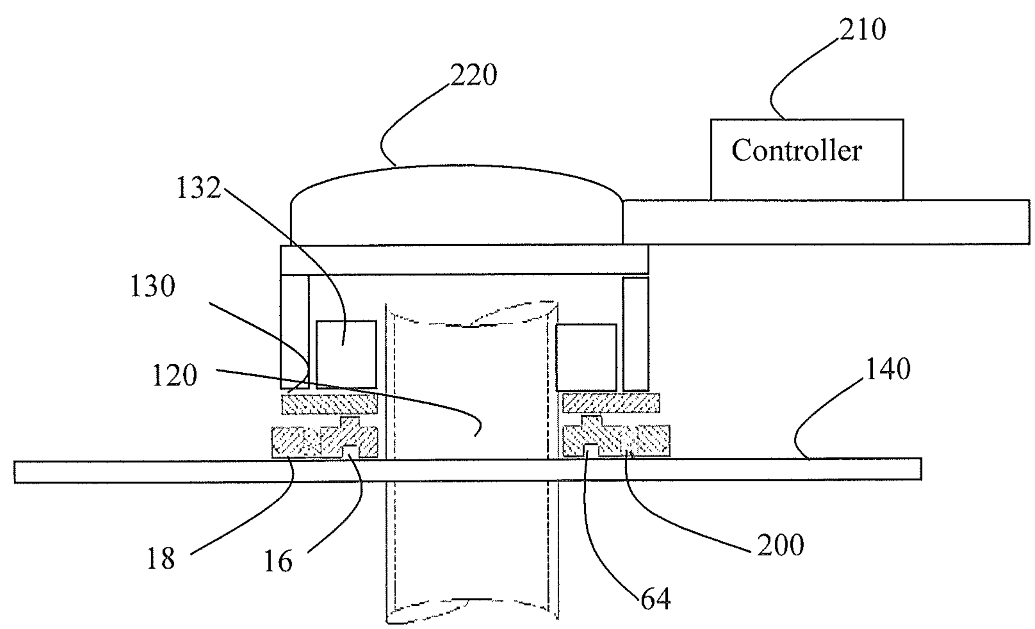
FIG. 5 depicts a cross-section of the direct tension indicating washer of FIG. 3 with a bolt in an alternate embodiment.

FIG. 5 depicts a cross-section of the direct tension indicating washer of FIG. 3 with a bolt in an alternate embodiment. The embodiment of FIG. 5 is similar to that in FIG. 4, and similar reference numerals are used for similar elements. The insert 200 in FIG. 5 is an active insert that generates a shut off signal upon a certain condition. Insert 200 may include a micro-emitter, such as a micro-RF emitter. In one embodiment, insert 200 generates an RF shut off signal when each end of the insert 200 is in electrical contact with metal. For example, in FIG. 5, tool 220 is used to tighten nut 132. When nut 32 is tightened sufficiently, washer 130 contacts one end of insert 200 and structure 140 contacts the other end of insert 200. This causes the insert 200 to emit a shut off signal that is received by a controller 210 associated with tool 220. Controller 210 may be integrated with tool 220 or be a separate device from tool 220. When the insert 200 emits the shut off signal, controller 210 ceases operation of the tool 220. This prevents operators from over tightening nut 132.

While preferred embodiments have been shown and described, various modifications and substitutions may be made thereto without departing from the spirit and scope of the invention. For example, the inserts may be used with conventional, non-squirting, direct tension indicating washers. Accordingly, it is to be understood that the present invention has been described by way of illustration and not limitation.

What is claimed is:

1. A direct tension indicating washer comprising:
a body having a first surface having a protuberance formed thereon;
the body having a second surface having an indentation formed opposite the protuberance;
an insert positioned internal to the body, the body and the insert being made from materials of different hardness;
an indicating material positioned in the indention; and
a channel leading from the indentation to an outer diameter of the body.

2. The direct tension indicating washer of claim 1 wherein:
the insert is made from a first material and the body is made from a second material, the first material being harder than the second material.

3. The direct tension indicating washer of claim 1 wherein:
the insert is electrically conductive and the body is not electrically conductive.

4. The direct tension indicating washer of claim 1 wherein:
the first material is metal and the second material is plastic.

5. The direct tension indicating washer of claim 1 wherein:
the insert is a ring positioned within the body.

6. The direct tension indicating washer of claim 1 wherein:
the insert is a plurality of inserts positioned throughout the body.

7. The direct tension indicating washer of claim 6 wherein:
the inserts are positioned within the body at equal angles to each other.

8. The direct tension indicating washer of claim 1 wherein:
the insert is the same thickness as the body.

9. The direct tension indicating washer of claim 1 wherein:
the body is formed using a rapid prototyping technique.

10. A direct tension indicating washer comprising:
a body having a first surface having a protuberance formed thereon;
the body having a second surface having an indentation formed opposite the protuberance; and
an insert positioned internal to the body, the body and the insert being made from materials of different hardness;
wherein the insert includes an emitter to emit a shut off signal to a controller.

11. The direct tension indicating washer of claim 10 wherein:
the emitter emits the shut off signal when each end of the insert is in contact with a metal surface.

* * * * *